INVENTORS
DESMOND STOLZ
CHARLES E. LETSCHE
BY John W. Michael
ATTORNEY

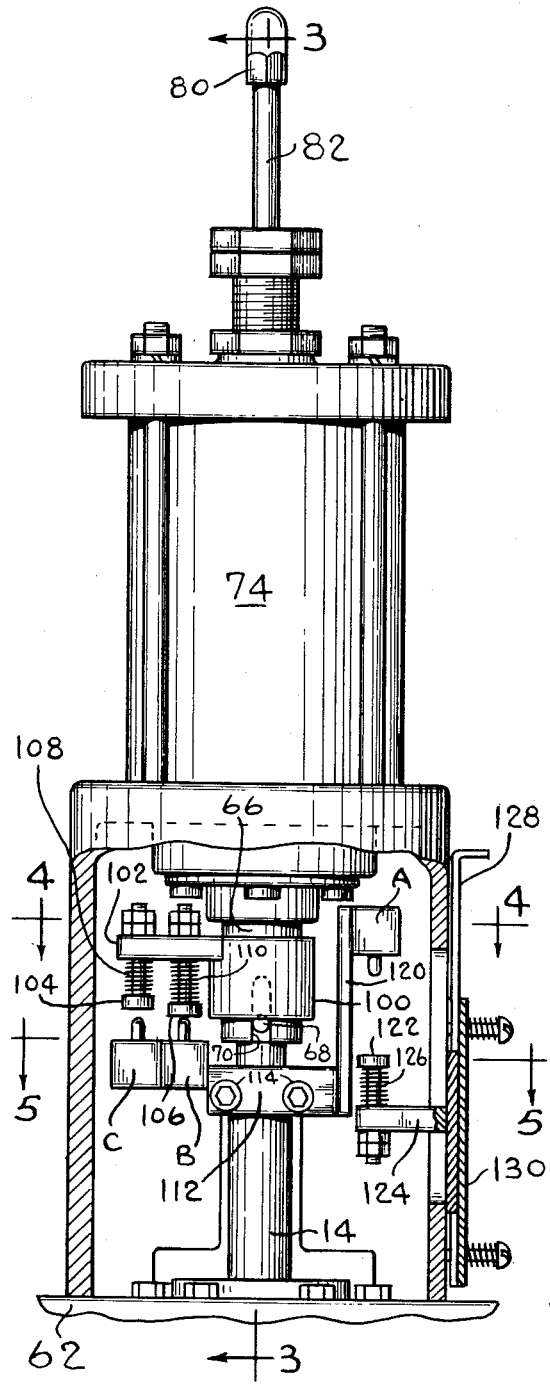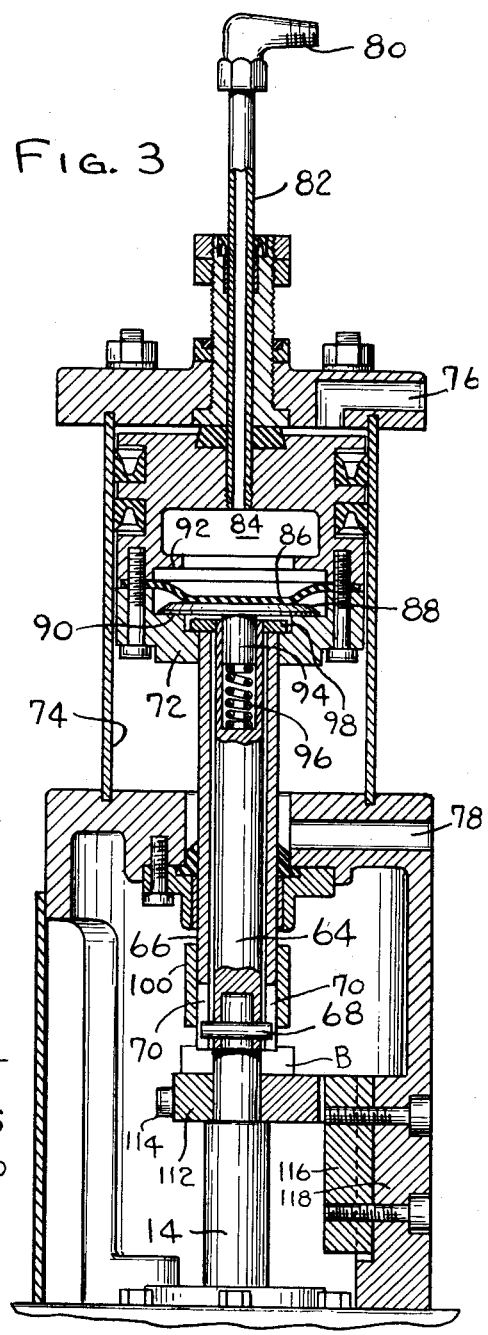

INVENTORS
DESMOND STOLZ
CHARLES E. LETSCHE
BY John W. Michael
ATTORNEY

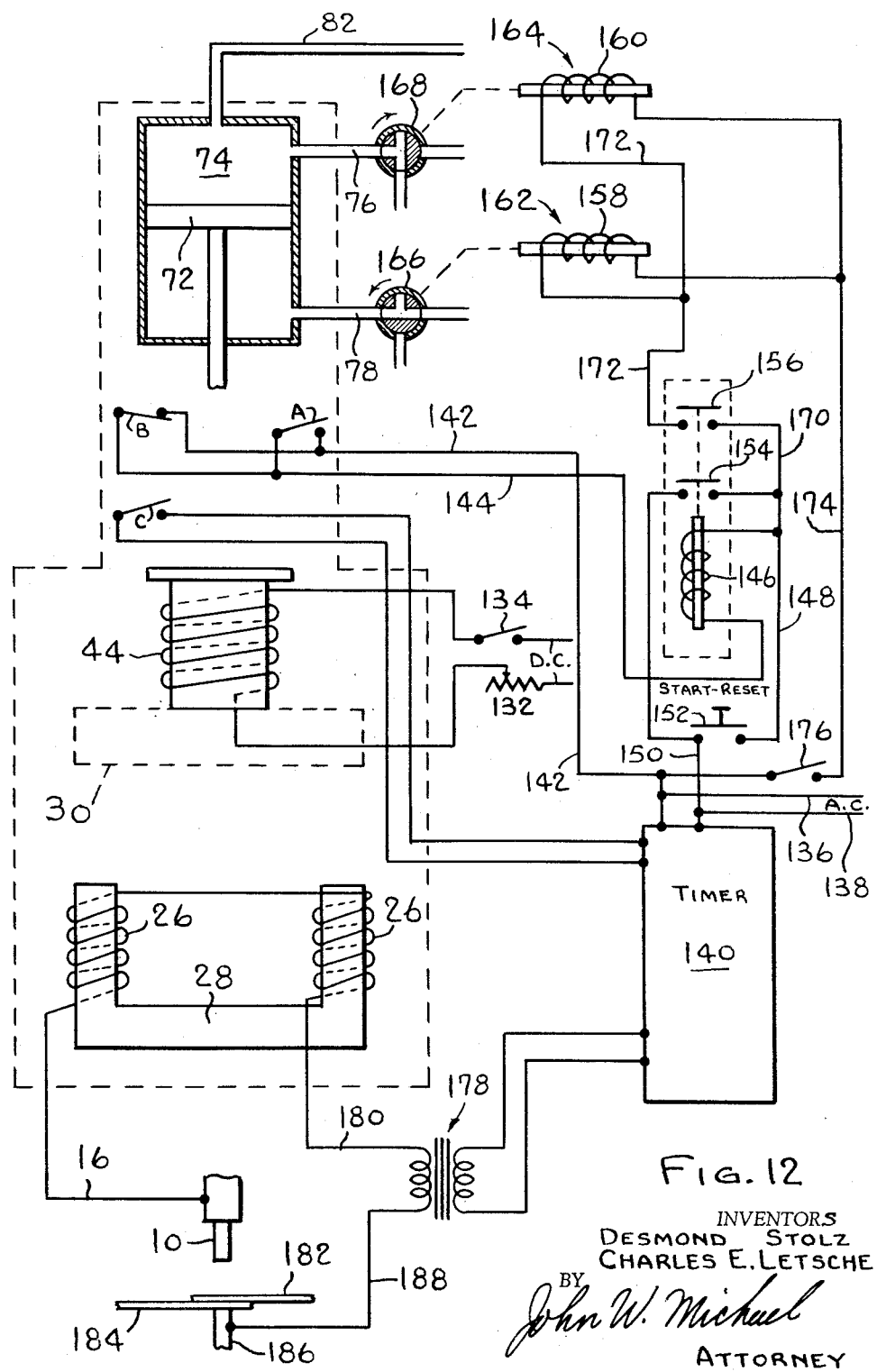

United States Patent Office 2,996,603
Patented Aug. 15, 1961

2,996,603
WELDING MACHINE
Desmond Stolz and Charles E. Letsche, Milwaukee, Wis., assignors to Acro Welder Mfg. Co., Milwaukee, Wis., a corporation of Wisconsin
Filed Jan. 2, 1959, Ser. No. 784,504
28 Claims. (Cl. 219—89)

This invention relates to a magnetic force welding machine and particularly to provision of structural refinements permitting of greater precision in the various welding operations which such machines are capable of performing.

In the early forms of magnetic welding machines the movable electrode was carried on a spindle fixed to an air ram which permitted moving the electrode to and from the work. During the welding operation the magnetic force acting on the armature exerted the extra force on the spindle which gave rise to the superior welding operation for which such machines have become noted. During the welding operation the spindle desirably moves a small distance as the metal melts. This movement is quite small but must take place in a very short period of time particularly since the advent of electronic timing mechanisms which have made it possible to effect the weld in a fraction of a cycle (of 60 cycle current). The inertia of the spindle or electrode becomes a very real factor when the short welding time is considered. Even though the motion is very small it was found the inertia attendant upon having the electrode carried by the air ram was sufficient to prevent obtaining optimum results. In an effort to reduce the inertia of the spindle, the construction shown in Wakely application Serial Number 633,784, now Patent Number 2,905,804, issued September 22, 1959, was evolved. In this construction there was a lost motion connection between the piston of the air ram and the spindle which permitted the spindle to move freely or be disengaged from the air ram during the welding operation. This resulted in a marked improvement in the quality of the weld.

The electronic timers utilized with magnetic welding machines are generally designed to initiate the flow of current at a predetermined point on the current waveform. The air ram has been employed to establish the initial pressure on the work and this pressure was generally of an increasing nature and if the desired pressure was reached at a point unsatisfactory for initiating the welding cycle, the timer would automatically delay the weld until the right part of the current waveform was reached. In the meantime, the pressure could rise well above the desired pressure on the electrode. Hence, the prior constructions have not achieved a fully satisfactory control over the pressure applied to the electrode. It has been suggested to overcome this failing of the prior constructions by utilizing a spring loading mechanism which comes into play upon attaining a predetermined loading on the electrode. The objection to such a system is that it introduces mechanical elements having poor inertia and follow-up characteristics and under certain conditions the springs could actually rebound in an undesirable way so as to exert a negative rather than a positive force.

The primary object of the present invention is to improve upon the follow-up and pressure applications of the prior art.

In carrying out the above objects, a structure has been evolved which lends itself to application of safety features to these magnetic welding machines to positively preclude injury to the operator should his finger, for example, be caught between the moving electrode and the work as the electrode moves toward the work. The structure also lends itself to positive control of the firing of the welding operation in that the welding operation cannot be initiated until the correct pressure has been applied to the electrode.

In the magnetic welding machine there has evolved a so-called delayed forge technique which utilizes a holding magnet which supports the armature in opposition to the force magnet which must overcome the holding magnet to attract the armature and deliver it forcibly against a stop on the spindle so as to transmit a forging blow to the spindle at a desired point in the welding operation. The relationship of the force of the holding magnet to the force of the force magnet plus the time of initiating the flow of current through the force magnet determine the time lag in delivering the forging blow. It is obvious that the armature must be pulled off the holding magnet at a precise moment in order to accomplish the desired function. When it is again realized that this welding operation deals in fractions of cycles of 60 cycles current, it will be appreciated that timing of this pull-off becomes highly important. In the prior constructions the holding magnet was so mounted as to introduce a variant in the time of pull-off.

Another object of this invention is to provide a holding magnet construction which reduces the likelihood of variable pull-off characteristics as explained above.

Other objects and advantages will be pointed out in, or be apparent from the specification and claims, as will obvious modifications of the two embodiments shown in the drawings, in which:

FIGURE 1 is a front view of the top portion of the present magnetic welding machine with a portion of the housing broken away to show the arrangement of switches;

FIGURE 3 is a vertical section taken on line 3—3 in FIGURE 1 to illustrate the details of construction of the hydraulic ram and loading mechanism;

FIGURE 12 is a generally schematic representation of the present structure coupled with a wiring diagram to aid in understanding of the present structure.

Figure 2:
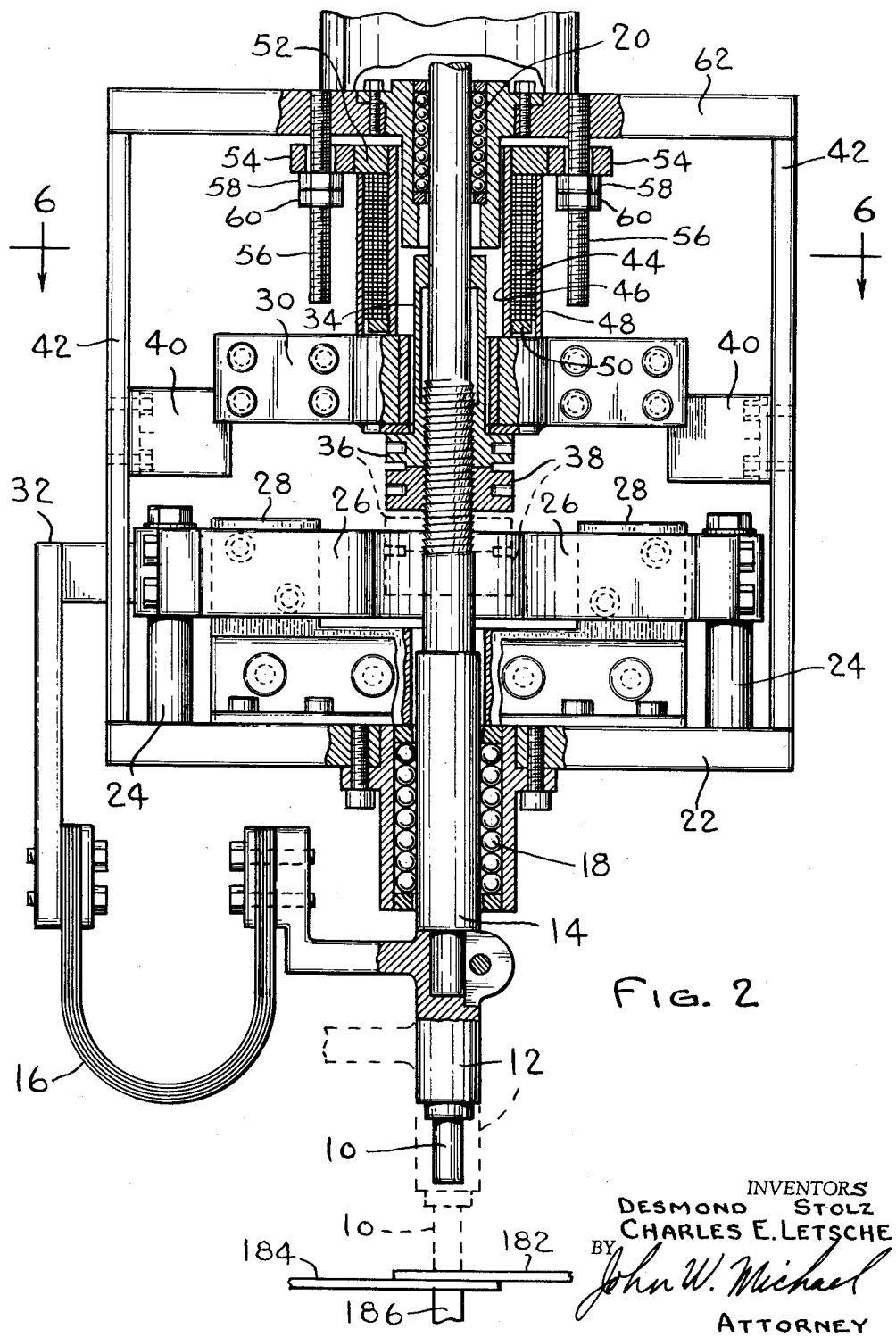
FIGURE 2 is a front view, partly in section, of the portion lying immediately below the structure illustrated in FIGURE 1.

In order to simplify the present disclosure as much as possible the framework of the machine is not shown except to the extent necessary to illustrate the parts wherein the invention lies. Similarly the lower or fixed table portion of the machine in which the fixed electrode is supported is not shown. This fixed electrode does appear in schematic form in FIGURES 2 and 7 through 10 as well as the schematic FIGURE 12.

The movable electrode 10 (see FIGURE 2) is carried in fitting 12 at the lower end of spindle 14. Power is supplied to the electrode through the flexible braided bus 16 as is customary in this art. Spindle 14 is guided for vertical movement in the linear bearings 18 and 20. These bearings provide a minimum of frictional resistance to linear motion of the spindle 14 and a maximum of lateral support. Since the bearings are well spaced vertically the spindle 14 is accurately guided and has good resistance to column action. The framework 22 is provided with vertical posts 24, 24 which support the single turn coil 26 which surrounds the core 28 which is magnetized when current is passed through the coil 26 to thereby exert an attractive magnetic force on armature 30. It should be noted that the drawing illustrates the coil 26 connected through bus bar 32 to the flexible bus bar 16 so that the coil will be energized when current is passed to the electrode. This is the customary practice although the coil and the electrode can be in separate circuits to be separately energized if it should be desirable to alter the timing in this respect.

Armature 30 is slidably mounted on the upwardly projecting sleeve portion 34 of adjustable stop nut 36 which is held in place on the spindle by lock nut 38. The armature is restrained against rotary motion by the fixed guides 40, 40 secured to the side plates 42, 42 of the frame. The upwardly projecting sleeve portion 34 provides a good bearing surface for the armature (which is provided with an internal bushing) and the stop nut 36 determines the lowermost position of the armature with respect to the spindle. Thus, the stop nut 36 is utilized to determine the spacing between the armature and the force magnet 28. This construction is generally similar to that shown in the aforesaid Wakeley application. It will be noted that FIGURE 2 illustrates the moving electrode 10 in a raised position while the dotted line illustrates the lower position of the electrode when it is contacting the work. In this position, the armature will be similarly lowered and will be quite close to the force magnet 28.

The aforesaid Wakeley application shows an upper magnet which is utilized in the delayed forge welding technique and which was subject to certain drawbacks. The present structure shows an improved version of the holding magnet. The improved magnet is shown as the annular coil 44 positioned inside the concentric magnetic sleeves 46, 48 and retained therein by the non-magnetic annular nut 50. This assembly is fixed on the magnetic plate 52 having apertured projecting ears 54 through which the screws 56 depend to permit vertical adjustment of the holding magnet structure by means of adjusting nuts 58, 58 which are retained in position by lock nuts 60, 60.

Figure 6:
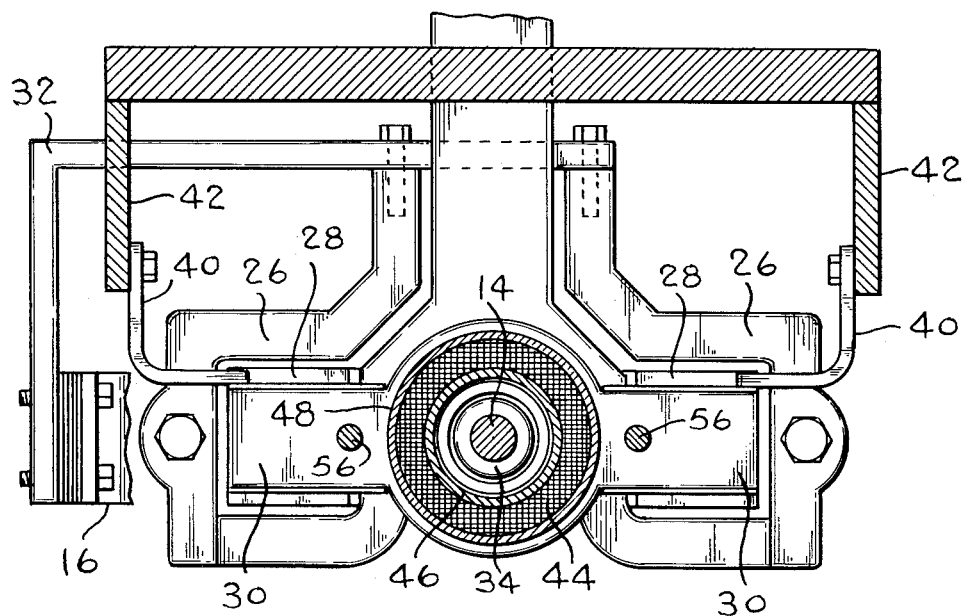
FIGURE 6 is a horizontal section taken on line 6—6 in FIGURE 2 and illustrates the more compact holding coil or magnet arrangement of the present invention.
Figure 4:
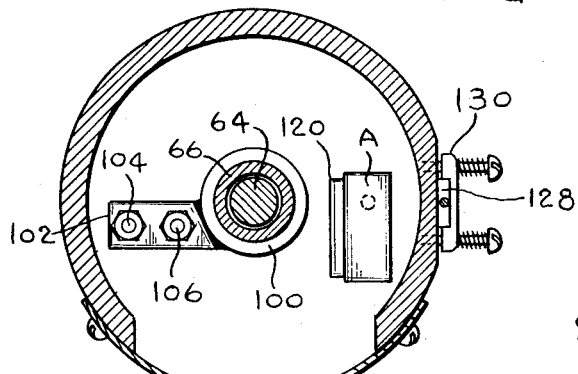
FIGURE 4 is a section taken on line 4—4 in FIGURE 1.

As now well understood in this art, this holding magnet is utilized to hold the armature 30 in an elevated position at the start of the welding operation. The magnetic force exerted by the force magnet 28 builds up in accordance with the timed sequence and the effect on armature 30 is, of course, determined by the spacing between the armature and the force magnet. When the force exerted by the force magnet on the armature overcomes the force of the holding magnet, the armature 30 is pulled away from the holding magnet and rapidly accelerated until it strikes the stop nut 36 to deliver the forging blow to the spindle. It will be appreciated that in this delayed forge welding operation the pull-off characteristic of the armature from the holding magnet must be quite accurate with respect to time. The previous constructions have employed holding magnets which were dimensionally similar (in plan view) to the armature. This led to difficulties in that any variations in the pull-off of the armature could result in canting the armature on the sleeve 34 and introduce a variable factor which is undesirable for obvious reasons. By bringing the present holding coil into a concentric arrangement as illustrated in FIGURES 2 and 6, the pull-off characteristics have been vastly improved and the accuracy of the time of delivery of the delayed forge blow has been improved as a direct result. It will be appreciated that the armature has a close sliding fit on sleeve 34 as distinct from the rather great clearance shown in the drawings for illustrative purposes. It should be emphasized that the concentric holding coil, which lies within the projected dimensions of the hub portion of the armature, is considered a marked advance over the prior art and is one of the points of novelty in the present construction.

Thus far mention has been made of vertical movement of the spindle and electrode without describing how the vertical movement is accomplished. The structure employed in effecting this movement is shown in FIGURES 1 and 3 which, it will be understood, illustrate the structure extending above that shown in FIGURE 2. As may be seen in these figures, the spindle 14 projects up through the upper linear bearing 20 and the top cross-plate 62 of the frame for connection through the inner shaft 64 of the concentric shafts 64, 66 by means of pin 68, the ends of which project into the slots 70 in the bottom of the outer concentric shaft 66 to prevent rotation of the shafts relative to each other. The outer concentric shaft 66 is secured to piston 72 in the air cylinder 74. It will be noted there is one air line connection or conduit 76 at the top of the cylinder and another conduit 78 at the bottom of the cylinder and it will be appreciated that introduction of air pressure above the piston 72 will force the piston down and expel air from below the piston. Reversing the direction of the air flow will, of course, reverse direction of the piston.

In the preferred form of this invention, the piston actually constitutes a separate cylinder arrangement with a separate air supply introduced at fitting 80 and through the tubing 82 which is slidable through the gaskets to prevent leakage. This air supply is introduced into chamber 84 above diaphragm 86 as seen clearly in FIGURE 3. The diaphragm is provided with a rigid diaphragm pad 88 which is movable between the limits defined by contact of the pad 88 with the shoulder 90 in the bottom of chamber 84 and contact of the pad (with the flexible diaphragm sandwiched between) with the upper shoulder 92. The pressure in chamber 84 holds the diaphragm pad against the lower shoulder during downward motion of the piston as shown in FIGURE 3.

The diaphragm pad is connected to a central boss 94 which is biased upwardly by a rather light spring 96 compressed between the boss and the bottom of the well in the inner shaft 64 into which the boss 94 projects. This acts to bias the diaphragm pad and the inner shaft apart to the extent determined by contact of the inner shaft flange 98 with the upper extremity of the outer shaft 66 at the point at which it is fixed in piston 72. It will be noted there is slight clearance between the inner shaft flange 98 and the underside of pad 88 and this clearance, as will appear more fully hereinafter, is quite important. It will be appreciated that if the piston is moving downwardly and the downward motion of spindle 14 is prevented, either by contact with work or an obstruction, the inner shaft would tend to move upwardly with respect to the outer shaft. During the relative motion permitted by reason of the slight clearance mentioned above, the only force exerted on the spindle will be that of the light spring 96. Of course, when the inner shaft flange 98 contacts the bottom of diaphragm pad 88 the full force of the actuating pressures will again be felt at the electrode.

Collar 100 fixed on the lower portion of the outer shaft 66 has a laterally projecting bracket 102 on which adjustable switch actuators 104, 106 are mounted. These switch actuators are biased downwardly by their respective compressed spring 108, 110 so as to be yieldable upwardly when the force of the biasing springs has been overcome. These switch actuators are adapted to cooperate with and actuate switches C and B carried on the bracket 112 secured on spindle 14 by cap screws 114 and having a rearwardly projecting portion provided with a suitable vertical groove cooperating with the guide 116 carried by frame bracket 118 to prevent rotary motion of the switch support bracket 112. This bracket also supports a vertical arm 120 upon which switch A is supported with its actuating pin projecting downwardly for cooperation with actuating plunger 122 which is adjustably supported on arm 124 with a similar biasing spring 126. The arm 124 is carried by vertically slidable member 128 retained in the spring loaded guide bracket 130. The spring load on this bracket will hold member 128 in its adjusted position and will permit sliding motion of the member in a manner to be described hereinafter.

FIGURE 12 gives a schematic representation of the circuit and controls for the machine described above. Since the holding coil 44 is quite separate electrically from the rest of the structure, it is well to point out that the holding coil which attracts the armature is provided with a suitable D.C. current supply which can be varied in magnitude by rheostat 132 and the flow can be regulated by switch 134. The A.C. power supply is brought in through lines 136, 138 which lead to timer 140, the details of which are not important here. These timers are customarily electronic timers capable of very precise control over current flow. Line 136 is connected to wire 142 which leads to switches A and B which are connected in parallel across line 142 and line 144. Switch A is normally open while switch B is normally closed and, hence, as long as one of these switches is closed wire 144 will be provided with current. This wire leads to the coil 146 of a relay. The other lead of coil 146 is connected to line 148. The other A.C. power supply line 138 is connected to line 150 as well as leading to the timer. Line 150 includes one terminal of the start-reset switch 152 as well as including one terminal of holding switch 154. The reset switch 152 is biased open and is of the momentary-closed type. When this is closed momentarily the relay 146 will be energized by a circuit from line 136 through line 142 and either switch A or B to line 144, through the coil 146 and to line 148, the reset switch 152, and line 150 back to the other power line 138. When the coil is energized, the armature will close the holding switch 154 which is in parallel across the coil with the reset switch. Therefore, upon release of the reset switch 152, the holding switch 154 will continue the energization of the relay. Switch 156 is also operated by the relay and closure of this switch will act to supply current to the coils 158, 160 of the solenoids 162, 164 which respectively operate valves 166, 168 which regulate the supply of air to the air cylinder 74 to actuate piston 72. Valves 166, 168 are shown in the positions they occupy when solenoids 162, 164 are not energized. Under these conditions air is supplied to cylinder 74 below piston 72 while the top portion of the cylinder is connected to atmosphere through valve 168. This, of course, will result in raising the piston 72 in cylinder 74.

Solenoids 162, 164 are connected in parallel. As pointed out above, closure of the holding switch 154 and of switch 156 will provide current from line 150 through the holding switch 154 to line 170, through switch 156 to line 172 which leads to both coil 158 and coil 160. These coils are, in turn, connected to line 174 which leads to foot switch 176 which, when closed, connects to the power line 136. Therefore, when the foot switch is closed the solenoids 162, 164 are energized to actuate valves 166, 168 and reverse the flow of air to cylinder 74 and thus move the piston 72 downwardly.

After the start-reset switch has been momentarily closed to establish a circuit through the holding switch 154 and to close switch 156, the operation of the piston is regulated by the foot switch. Reference to the wiring diagram will demonstrate that if at any time both switches A and B are open, the circuit through relay coil 146 will be broken and switches 154, 156 will open. Switches A and B are employed to introduce a safety feature in the present machine. The safety feature will be explained below and has not been found in prior art structures.

Before considering the details of the safety arrangement the description of the wiring diagram should be completed. It will be noted that switch C is connected to the timer 140. This switch will be closed if all conditions are safe and when the machine is ready to be fired. At this point the timer will take over and determine at what point on the current waveform the machine will actually be fired. As will appear more fully hereinafter, the proper pressure will be maintained on the electrode during any waiting period required between the closure of switch C and the actual firing under the control of timer 140. This pressure will be maintained without introducing any mechanical lag, as will be pointed out later.

The wiring diagram also shows leads from the timer 140 to the transformer 178, the secondary of which is connected to bus bar 180 which takes one turn around the core 28 and then leads through the flexible lead 16 to electrode 10 and the circuit is made through the work pieces 182, 184 to the lower electrode 186 which is connected to the secondary through a suitable bus bar 188.

Figure 7:
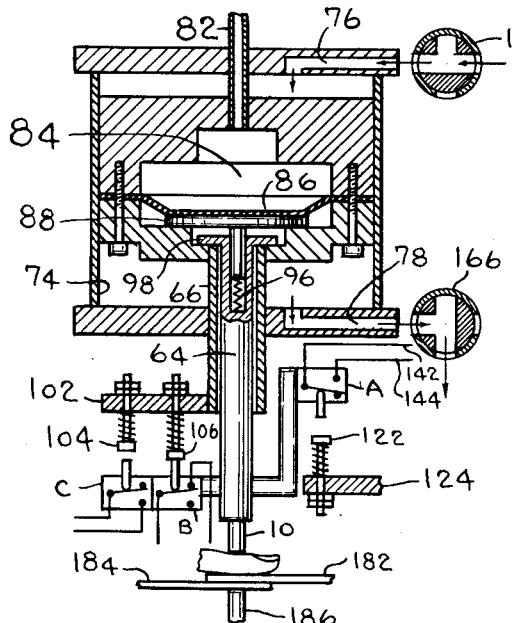
FIGURE 7 is a schematic representation to illustrate the general position of the parts and switches at the moment the electrode contacts an obstruction such as the finger between the electrode and the work.
Figure 8:
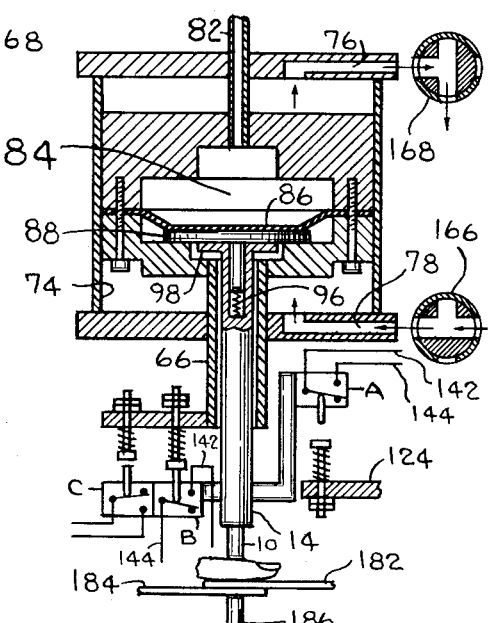
FIGURE 8 is a schematic showing similar to FIGURE 7 but illustrates the manner in which the automatic reversal of the spindle motion is accomplished.

To place the present machine in operation the start-reset button is depressed momentarily to establish the holding circuit and close switches 154, 156. The sliding member 128 which supports the actuator 122 for switch A is then raised to its uppermost position. After this has been done, the foot switch 176 is closed to energize the solenoid valve and lower the piston 72 until the electrode 10 contacts the work. As the piston moves down bracket 112 carrying switch A will also move down in contact with the actuator 122 for switch A. This will trip switch A and will continue down and will then move the member 128 carrying the actuator 122 down to the limit determined by contact of the electrode with the work. At this point, the actuator has been properly positioned since the switch A will thereafter be closed any time the electrode contacts the work. Actually the closure of switch A will take place slightly before contact is made but this will be a very short distance precluding the possibility of any obstruction between the work and the electrode, such as the operator's finger. Now then, actuator 106 carried by the outer shaft 66 in position above switch B is so adjusted that it will actuate (open) switch B if there is relative motion between shaft 64 and shaft 66. As pointed out above, there can be relative motion between these two shafts to the extent of the clearance between the shaft flange 98 and the bottom of diaphragm pad 88 during which time the only force which would be felt at the electrode would be the force of the light biasing spring 96. Switch B and its actuator are adjusted so as to trip within this distance and, hence, if the operator's finger should be caught between the downcoming electrode and the work (as illustrated in FIGURE 7) this relative motion will take place and switch B will be tripped to its open position as shown in FIGURE 8. Now then, since the spindle has not moved down far enough for switch A to be closed, the circuit through the holding coil of the relay will be broken and, hence, switches 154 and 156 will open. This will immediately effect reversal of valves 166 and 168 (as shown in FIGURE 8) to raise the piston and prevent injury to the operator. During the time in which the relative motion takes place to actuate switch B, the only force which the operator would feel on his finger is the force of the light biasing spring 96. It will be obvious that with the holding coil having been de-energized, it will be necessary to press the reset button in order to reestablish the operation of the machine.

Figure 9:
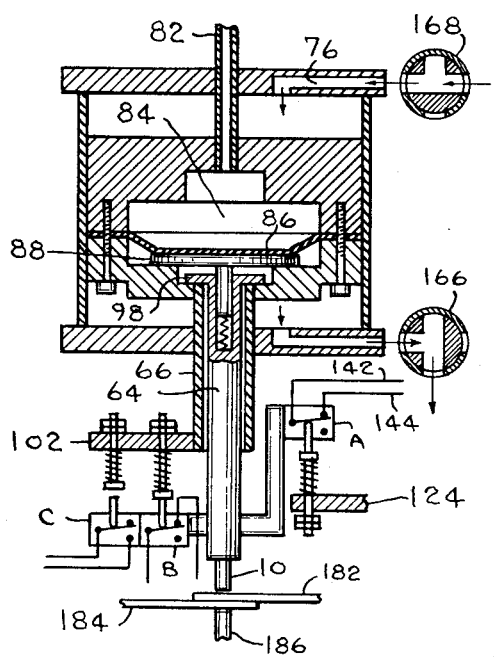
FIGURE 9 shows the normal operation of the mechanism when no obstruction is encountered and at the moment before the electrode contacts the work.
Figure 10:
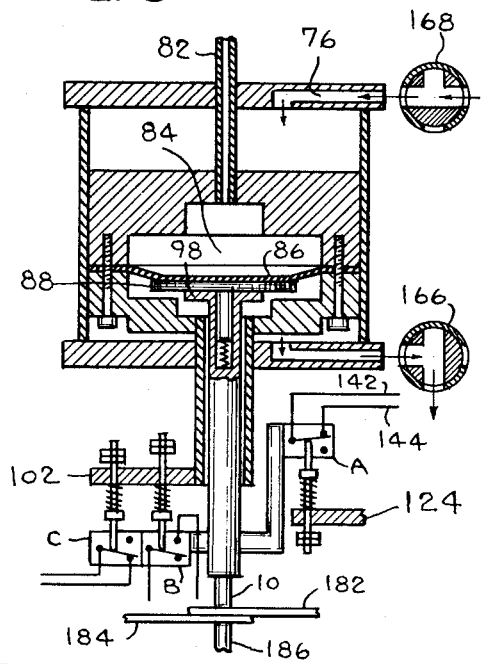
FIGURE 10 shows the manner in which the switches are actuated to initiate the welding operation.

If the operator's finger had not been in the way, the piston would continue its downward movement and switch A would be actuated as shown in FIGURE 9. Since switch A is in parallel with switch B the holding coil circuit will be maintained even though switch B will subsequently be opened when the electrode contacts the work as shown in FIGURE 10 and prevents further downward movement of the inner shaft while the outer shaft and the piston continue moving downwardly. Reference to FIGURE 1 will demonstrate that the actuators for switches B and C are so spaced that switch B will open prior to closure of switch C. This is necessary for the safety reasons pointed out above as well as being necessary to insure that the piston will move downwardly with respect to the inner shaft before the circuit through switch C can be closed. Thus, the parts will assume the positions shown diagrammatically in FIGURE 10 by the time switch C closes. At this time, it will be noted, the diaphragm is completely free of connection with the piston except through the flexible diaphragm. Therefore, the pressure in chamber 84 is the only pressure acting on the electrode and this pressure can be accurately regulated to achieve a precise degree of loading on the electrode so as to establish the desired pressure before switch C is closed. This pressure can be maintained accurately even though the piston continues movement downward (as it does) and, therefore, the pressure on the electrode will remain constant during any waiting period after closure of switch C for the timer to reach the desired point on the A.C. current waveform for the firing. This, therefore, achieves an accurate control over the pressure.

When the switch C is closed to fire the welder through the timer and the current flows between the electrodes, there will be some slight melting of the work pieces 182, 184 and at this time the follow-up action of the electrode becomes important. The present arrangement achieves better follow-up than the structure shown in the Wakeley application mentioned above in which there was a lost motion connection between the piston and the spindle. Reference to FIGURE 10 will show that the gap between the inner shaft flange and the underside of the diaphragm pad has been taken up so that there is virtually a solid connection between the diaphragm pad and the spindle at the moment of firing. Now then, chamber 84 and its associated diaphragm are selected to provide a large volume with respect to the motion necessary and since this is at an elevated pressure, the follow-up action will be quite fast. The spindle has the armature acting directly on the spindle at the moment the follow-up is needed and the spindle is aided by the pressure on the upper side of diaphragm 88. Therefore, the present spindle cuts free of the piston and is aided by the loading pressure. The superior follow-up action achieved by this construction results in superior welds.

After the welding current has passed through the electrode, which, it will be remembered, takes but a very short period of time, the piston will have continued travelling down with respect to the diaphragm and the diaphragm will finally contact the upper flange inside chamber 84 whereupon the connection between the piston and the diaphragm and the inner shaft and, hence, the spindle and electrode become solid again and the pressure applied through conduit 76 above the piston acts on the spindle and, hence, an increased pressure can be achieved at the end of the weld operation. This type of increased pressure operation is particularly desirable in certain types of projection welding.

Figure 11:
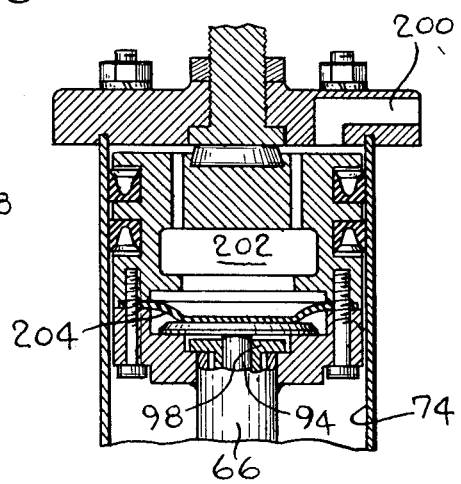
FIGURE 11 shows a modified form of the air cylinder wherein only one source of pressure is utilized as opposed to the double source used in the primary form of the invention.
Figure 5:
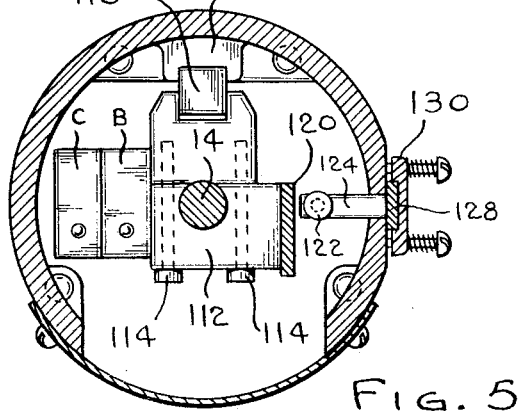
FIGURE 5 is a section taken on line 5—5 in FIGURE 1.

From the above discussion it will be apparent that the initial movement of the piston and spindle is achieved with the pressure provided above the piston and after contact is made with the work the loading pressure is that pressure in chamber 84 which can be completely independent of the pressure above the piston. After the piston has moved relative to the diaphragm to the extent permitted by the vertical space between the diaphragm and the bottom side of the inner flange 92 in chamber 84, the initial pressure (that is, the pressure above the piston) can be utilized again for electrode loading purposes. In this connection, it will be of interest now to refer to FIGURE 11 which shows a variation of the structure just described in that only one pressure source is utilized. This pressure is applied to conduit 200 and acts both on the top side of the piston and in the chamber 202 above diaphragm 204. In this arrangement it will be appreciated that the loading pressure in chamber 202 cannot be different than the pressure applied through conduit 200 since they have a common source. However, the present arrangement still achieves those desirable features of precise control of the loading pressure at the initiation of the welding operation and the freedom of the spindle from the piston during the follow-up action which is still aided by pressure above the diaphragm. The structure shown in FIGURE 11 is not as desirable for complete versatility as that described with respect to the principal embodiment of the present invention. However, for certain types of limited application the structure of FIGURE 11 will prove satisfactory.

In view of the above description, it will be apparent that the present welding machine achieves improvements over prior art structures in several respects. One of these points is the new construction of the holding magnet concentric with the spindle and lying within the projected plan area of the hub of the armature so as to insure against, or at least minimize, any canting effect of the armature when pulling off the holding magnet. This, in turn, results in more precise control of the moment of impact in the delayed forge welding technique.

Another marked advance in the present structure is achieved by reason of what might be termed a double cylinder arrangement wherein one cylinder is used to actuate the piston which accounts for the major travel of the spindle while a second cylinder is utilized for loading and follow-up purposes. As a result of the double cylinder arrangement shown in the drawings, it is now possible to provide the welding machine with very accurate and reliable safety features through the use of switches A and B in the manner noted above. In the normal course of operation, it will be remembered, switch A will close prior to opening switch B and, hence, the circuit through the relay will be maintained and switches 154 and 156 will be maintained closed so as to insure the correct operation. If, however, switch B is opened prior to closure of switch A, as can happen only when there is an obstruction between the electrode and the work, then the relay coil 146 will be de-energized to open switches 154, 156 which, in turn, will reverse valves 166, 168 and cause the piston to rise to its uppermost position and permit removal of the obstruction. It will be remembered that during the period in which switch B is caused to operate, the only force which can be applied to the obstruction is that force of the light biasing spring 96.

If, on the other hand, there is no obstruction in the path and the circuit through the relay coil 146 is maintained, switch C will be closed at the point in spindle travel in which the proper pressure must be applied to the spindle since the diaphragm pad is moved off its lower rest. Also it will be remembered, this insures that there is room left for travel of the diaphragm downwardly with respect to the piston to insure rapid follow-up. This rapid follow-up takes place completely independently of the inertia of the piston and, hence, can be very rapid, particularly when it is remembered that the follow-up action is aided by the loading pressure, which pressure is applied to a relatively low mass mechanism.

It will be appreciated that certain features of this invention are applicable to non-magnetic welding machines. Similarly, the invention here permits of variations within the spirit of the invention. For these reasons the invention is to be limited only by the scope of the claims.

We claim:

1. In a welding machine having a fixed electrode, a moving electrode, a fluid ram operatively connected to the moving electrode for moving the electrode, a second fluid ram including a loading chamber interposed between the first ram and the electrode and operative upon the moving electrode contacting the work to load the electrode independently of the first ram, the loading chamber of the second ram being pressurized to establish a constant load on the electrode and having a volume great enough to limit to a small value the pressure changes incident to movement of the second ram during the welding operation.

2. A welding machine according to claim 1 including means operative in response to interruption of electrode movement towards the work prior to contact with the work to reverse movement of the first ram.

3. A welding machine according to claim 2 in which the last named means including lost motion means operative upon contact of the moving electrode with an object to effect transfer of the force applied to the moving electrode from the first to the second ram, means biasing the lost motion means so the only force applied on the electrode during the transfer is the biasing force, and switch means operative during the transfer to reverse movement of the first ram in response to relative movement between the rams.

4. A welding machine according to claim 3 in which there is a second switch operative just prior to contact of the electrode with the work to shunt the first switch to thereby prevent reverse movement of the first ram upon contact with the work.

5. A welding machine according to claim 1 in which the first ram continues movement toward the work after the electrode contacts the work, and means responsive to a predetermined movement of the first ram after electrode contact with the work to close the welding circuit.

6. A welding machine according to claim 1 in which each ram includes a cylinder and a piston, the cylinder of the second ram being located in the piston of the first ram.

7. A welding machine according to claim 6 in which the piston of the second ram is connected to the electrode through a lost motion connection, spring means biasing the lost motion connection to its maximum lost motion position whereby the lost motion must be taken up against the force of the spring on contact of the electrode with the work, the piston of the second ram being connected solidly to the electrode after the lost motion is taken up whereupon the fluid pressure in the second ram can act to load the electrode.

8. A welding machine according to claim 7 including electric circuit means operative to control fluid flow to the first ram, switch means in said circuit means to reverse fluid flow to the first ram during taking up the lost motion, and switch means operative to shunt the first switch means when the electrode reaches a predetermined distance from the work.

9. A welding machine including an electrode, first and second fluid rams serially connected to the electrode both of said rams including a pressure chamber, fluid pressure means connected to the pressure chambers for actuating both rams, the first ram being operative to move the electrode towards the work, the second ram being operative upon contact of the electrode with the work to exert a loading force on the electrode, the first ram being disengaged from the electrode when the second ram is effective and the pressure chamber of the second ram being pressurized to establish a substantially constant load on the electrode and having a volume great enough to limit to a small value the pressure changes incident to movement of the second ram during the welding operation.

10. A welding machine according to claim 9 in which the first ram continues movement relative to the second ram while the second ram is effective, and means operative upon the first ram travelling a predetermined distance with respect to the second ram to render the first ram operative to act on the electrode again.

11. A welding machine according to claim 9 in which the rams have separate fluid pressure supplies.

12. A welding machine according to claim 9 including means for closing a welding current circuit when the second ram is effective.

13. A welding machine according to claim 10 including spring means interposed between the first and second rams to be effective in the period of time between contact of the electrode with an object and the second ram becoming effective whereby the only force acting on the electrode during that period is the spring force.

14. A welding machine according to claim 13 including switch means operative during said period to reverse flow to the fluid rams to reverse the direction of electrode travel.

15. A welding machine according to claim 14 including a switch for shunting the switch means just prior to contact of the electrode with the work.

16. In a welding machine having a fixed electrode, a moving electrode, a fluid ram operatively connected to the moving electrode for moving the electrode, a second fluid ram interposed between the first ram and the electrode, each of said rams including a cylinder and a piston, the cylinder of the second ram being located in the piston of the first ram, so that the second ram loads the electrode independently of the first ram when the electrode contacts the work, means for establishing a controlled pressure above the second piston to maintain a substantially constant load on the electrode and the cylinder of the second ram having a volume great enough to limit to a small value the pressure changes incident to movement of the second ram during the welding operation.

17. A welding machine according to claim 16 wherein said last named means comprises a number of fixed openings leading from the pressure space above the first piston to the space in the cylinder above the second piston.

18. A welding machine according to claim 16 including a secondary chamber in communication with the space in the cylinder above the second piston so that the variation in volume due to movement of the second piston in the cylinder produces little change in pressure in the cylinder.

19. A welding machine including a stationary electrode and a moveable electrode, a first ram operatively connected to the moveable electrode, a second ram positioned within the first ram and connected to the moveable electrode, both of said rams including a loading chamber, fluid pressure means connected to the loading chambers for actuating both rams, the first ram being operative to move the electrode towards the work, the second ram being operative upon contact of the electrode with the work to exert a loading force on the electrode, the first ram moving relative to the second ram when the second ram is operative, a switch secured to the second ram, a switch actuator secured to the first ram and positioned to engage the switch, whereby said switch is actuated by relative motion between the rams and means responsive to actuation of the switch to reverse the motion of the first ram when the second ram engages an obstruction.

20. A welding machine according to claim 19 including a second switch responsive to a predetermined movement of the second ram relative to the location of the stationary electrode to shunt the first switch.

21. In a welding machine having a fixed electrode, a moving electrode, a first ram operatively connected to the moving electrode, a second fluid ram interposed between the first ram and the electrode to load the electrode independently of the first ram, the second ram having a chamber of large volume and having piston means actuated by the pressure in the chamber, limit means within the chamber for limiting motion of the piston means in the direction reducing the size of the chamber.

22. A welding machine including an electrode means for moving the electrode to and from the work, a fluid ram interposed between the moving means and the electrode, the ram having a chamber adapted to be connected to a pressure source to establish a desired loading force by the pressure in the chamber, the ram being independently operative to load the electrode after the moving means has moved the electrode into contact with the work with sufficient force to equal the loading force exerted by the ram, the chamber of the ram establishing a generally constant load and having a volume great enough to limit to a small value the pressure changes incident to movement of the electrode during the welding operation.

23. A welding machine according to claim 22 in which the moving means is a ram the pressure in which builds up on contact of the electrode with the work until the pressure equals the loading pressure in the first named ram at which time the first named ram becomes effective to load the electrode.

24. A welding machine according to claim 23 including fluid pressure means operative to load the electrode during and after the welding operation, the pressure means being operative to damp motion of the electrode incident to the welding operation.

25. In a welding machine having a fixed electrode, a moving electrode, a fluid ram operatively connected to the moving electrode for moving the electrode, a second fluid ram interposed between the first ram and the electrode and operative upon the moving electrode contacting the work to load the electrode independently of the first ram and means for delivering a sudden supplementary force to the electrode during the welding operation, the second ram being operative to damp rebound motion of the electrode occasioned by said sudden force.

26. In a welding machine having a fixed electrode, a moving electrode, piston means for moving the moving electrode into an operative position with respect to the fixed electrode, and diaphragm means for loading the electrodes independently of the piston means, said piston means including an internal pressure chamber, the diaphragm means being responsive to the pressure in the chamber.

27. In a welding machine having a fixed electrode, a moving electrode, a fluid ram for moving the moving electrode into operative engagement with the fixed electrode and including a pressure chamber within the ram, a diaphragm responsive to the pressure in the chamber, and means responsive to the movement of the diaphragm to independently load the electrode after it has been moved into engagement with the fixed electrode.

28. In a welding machine having a fixed electrode, a moving electrode, piston means for moving the moving electrode into an operative position with respect to the fixed electrode, said piston means including an internal pressure chamber, diaphragm means responsive to the pressure in the pressure chamber for loading the electrodes independently of the piston means, said pressure chamber having a large volume sufficient to limit to a small valve the pressure changes incident to movement of the diaphragm means during a welding operation and means for limiting the relative movement of the diaphragm with respect to the piston.

References Cited in the file of this patent

UNITED STATES PATENTS

| | | |
|---|---|---|
| 1,327,792 | Thornton | Jan. 13, 1920 |
| 1,976,552 | Friesen | Oct. 9, 1934 |
| 2,312,938 | Stieglitz | Mar. 2, 1943 |
| 2,358,826 | Purat | Sept. 26, 1944 |
| 2,494,847 | Welch | Jan. 17, 1950 |
| 2,650,977 | Welch | Sept. 1, 1953 |
| 2,776,362 | Welch | Jan. 1, 1957 |
| 2,862,100 | Jones | Nov. 25, 1958 |
| 2,883,516 | Bek | Apr. 21, 1959 |
| 2,892,068 | Park et al. | June 23, 1959 |
| 2,905,804 | Wakeley | Sept. 22, 1959 |